United States Patent [19]
Spilker et al.

[11] Patent Number: 5,511,819
[45] Date of Patent: Apr. 30, 1996

[54] FASTENERLESS AUTOMOTIVE PASSENGER AIRBAG MODULE ENDCAP

[75] Inventors: David L. Spilker, Pleasant View; Donald J. Paxton, Brigham City, both of Utah

[73] Assignee: Morton International, Inc., Chicago, Ill.

[21] Appl. No.: 411,037

[22] Filed: Mar. 27, 1995

[51] Int. Cl.⁶ ............................. B60R 21/16; B65D 6/00
[52] U.S. Cl. ................... 280/728.2; 280/732; 292/32; 220/615; 220/682
[58] Field of Search .................. 280/728.1, 728.2, 280/728.3, 732, 741; 403/13, 14, 363; 292/32, 42; 220/615, 617, 618, 621, 682, 684, 690, 691

[56] References Cited

U.S. PATENT DOCUMENTS

| 407,910 | 7/1889 | Waller | 220/682 |
|---|---|---|---|
| 3,987,924 | 10/1976 | Uitz | 220/691 |
| 4,707,936 | 11/1987 | Steinhoff | 403/14 |
| 4,941,678 | 7/1990 | Lauritzen et al. | 280/732 |
| 5,069,480 | 12/1991 | Good | 280/728.2 |
| 5,332,256 | 7/1994 | Lauritzen et al. | 280/732 |
| 5,407,226 | 4/1995 | Lauritzen et al. | 280/732 |
| 5,458,364 | 10/1995 | Mueller et al. | 280/728.2 |

FOREIGN PATENT DOCUMENTS 828220  1/1952  Germany.

Primary Examiner—Paul N. Dickson
Attorney, Agent, or Firm—Lawrence I. Field; Gerald K. White

[57] ABSTRACT

An automotive passenger airbag module is assembled by securing two endcaps to a chute or housing. The endcaps have tabs which engage channels in the sidewalls of the housing and may be secured by staking portions of the channels to hold the tabs fast during deployment of the airbag.

3 Claims, 2 Drawing Sheets

FASTENERLESS AUTOMOTIVE PASSENGER AIRBAG MODULE ENDCAP

THE INVENTION

This invention relates to passenger side airbag modules for automotive vehicles. More particularly it relates to an improved endcap for such modules and to the manner in which it is assembled to the remainder of the module.

BACKGROUND OF THE INVENTION

Recently issued U.S. patents describing passenger side airbag modules and the assembly of such modules from individual components include the following:

Good U.S. Pat. No. 5,069,480 issued Dec. 3, 1991

Lauritzen U.S. Pat. No. 5,332,256 issued Jul. 26, 1994

From the disclosures of these patents it will be seen that modules have been assembled from individual components including:

a cushion pack containing a folded airbag, an inflator canister containing means for generating gas to inflate the cushion (airbag); and a housing or frame which receives the cushion pack and the inflator canister.

Many prior art housings have been formed by stamping a metal sheet to the desired shape, or by casting or molding metal or synthetic resins to form a one piece housing. While these have been satisfactory for simple shapes, more complicated shapes such as those shown in Lauritzen U.S. Pat. No. 5,332,256 or Lauritzen U.S. Pat. No. 4,941,678 may be produced by extruding the sidewalls and bottom of the housing and then attaching separately formed endcaps.

When this is done, the endwalls are usually secured to the sidewalls by screws, rivets, welding, or other means for insuring that they remain in place relative to one another in a location in the automotive vehicle until such time as a collision occurs and the airbag is inflated. In the present invention the end caps are secured to the sidewalls of the housing without the use of screws, rivets, or other fasteners.

SUMMARY OF THE INVENTION

A principal object of the invention is to provide an improved means for securing end caps to the housing of a passenger side airbag module.

Another object of the invention is to provide an endcap which requires no screws or rivets in order to become securely fastened to the module housing.

A further object is to provide a simple, inexpensive means for assembling an endcap member to a housing in order to complete the housing of an airbag module.

A further object of the invention is to simplify the manner in which endcaps are attached to the housing of a passenger side airbag module.

In order to accomplish these and other objects of the invention, there is provided a generally "U" shaped housing or chute, preferably formed by extrusion and having sidewalls provided with a channel adapted to receive endcaps to enclose the air bag module.

The endcaps are secured to the sidewalls of the housing by virtue of their configuration as will be explained below and by staking the lips of a channel in the housing to tabs on the endcaps.

A principal benefit of this invention is the elimination of the need for separate fasteners such as screws or rivets to secure the endcaps to sidewalls in order to form a housing of the air bag module.

In a first embodiment of the invention, the endcaps are provided with tabs which engage channels in the sidewalls of the housing. These tabs are provided with serrations or teeth to engage the walls of the channels in the housing for retention. In addition, the sides of the housing engage the teeth further during airbag deployment. Under deployment pressure the reaction can expands and engages the teeth securely during the crucial part of the deployment.

In a second embodiment, the tabs are not serrated. Instead, they are flat and are provided with apertures or cut away portions into which metal from the walls of the channels in the sidewall of the housing may flow when the housing is staked to the endcap.

In either embodiment, additional security of the assembly is achieved by staking (deforming) the lips of the channels on the housing which receive the tabs on the endcaps.

DRAWINGS

Other objects and benefits will be pointed out or will become apparent from the description which follows taken in conjunction with the drawings in which.

DESCRIPTION

Figure 1:
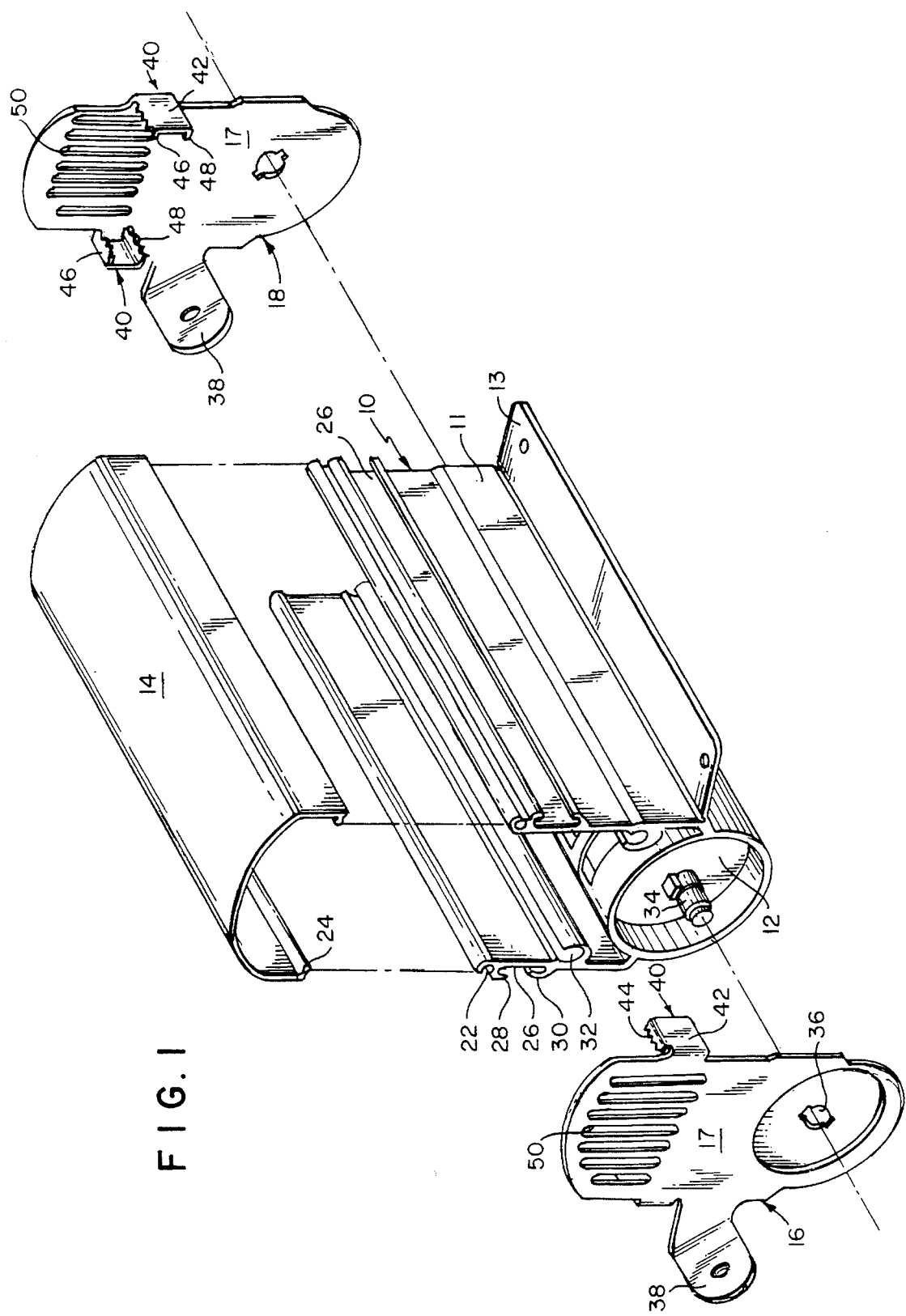
FIG. 1 is an exploded, schematic view in perspective of a passenger side airbag module.

As seen in FIG. 1 the passenger side airbag module is assembled from a housing or chute 10 having sidewalls 11 and a base and dimensioned to receive a cushion pack assembly (not shown) which fits snugly into the housing 10 between the sidewalls of the housing. The module also includes an inflator or reaction canister 12 similar to that shown in the above noted Lauritzen et al patents. The inflator 12, as shown, in shorter than housing 10.

The reaction canister 12 may be any of those known in the art and is not further illustrated. Canister 12 is provided with a wing 13 extending parallel to its principal axis for insertion into a groove in the sidewall of housing 10.

Preferably housing 10 is an extrusion of metal or synthetic polymer and is provided with channels or grooves for a number of specific purposes.

Housing 10 is completed by a cover 14 and endcaps 16, 18.

Figure 2:
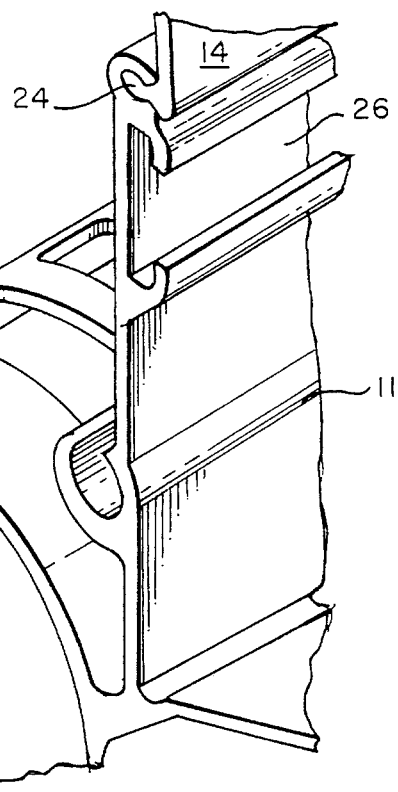
FIG. 2 is a fragmentary view details of the sidewalls of the housing.

As seen in FIGS. 1 and 2 housing 10 is an extruded aluminum shape having a generally "U" shape, the legs of the "U" being sidewalls 11 joined at their lower extremities by a base. At their upper ends, sidewalls 11 are each provided with a groove 22 for receiving a flange 24 on cover 14. Cover 14 is assembled to the housing 10 either by sliding the cover flange 24 into housing sidewall groove 22 or by snapping the cover 14 into the housing 10.

Adjacent groove 22 is a channel 26 running the length of sidewall 11. Channel 26 is defined by an upper lip 28 and a lower lip 30 and is dimensioned to receive a tab 40 extending from each of end caps 16 and 18.

A further slot 32 is provided in the sidewall 11 of chute or housing 10 to receive a flange on a cushion package (not shown) which is secured to the housing 10 in known fashion.

The reaction canister, diffusion tube and accessories shown in the Lauritzen et al patents are known in the art and do need not be described further except to note reaction canister 12 has a stud 34 at its ends. Stud 34 is shaped to pass through an opening 36 provided in each endcap 16, 18. Studs 34 and tabs 40 orient the endcap with reference to the remainder of the structure.

Endcap 16 comprises a plate 17 having a dished shape portion 36 which fits into the recess in housing 10 in which the reaction canister is received. Endcap 16 also has an ear 38 for connection to an automobile body (not shown) and a pair of tabs 40 for engaging channel 26 in the sidewall of housing 10.

Each tab 40 extends perpendicularly to the plane of plate 17 and may be formed by bending the plate from which the endcap is formed. Each tab 40 has a smooth external face 42. Tab 40 is further bent to a channel shape having an upper flange 46 and a lower flange 48. The outer edges of each flange of the channel are serrated to provide gripping internal faces 44. Each tab 40 fits into channel 26 in the sidewall of housing 10 when endplate 16 is assembled to the sidewalls of housing 10. The serrations assist in firmly securing endcap 16 to housing 10, especially during deployment of the air bag cushion at which time the pressure inside housing increases and the housing tends to expand laterally engaging the serations. Vents 50 are provided in end caps 16 and 18 in order to permit end caps 16 and 18 to crush easily during low speed crashes when the air bag does not deploy.

Figure 3:
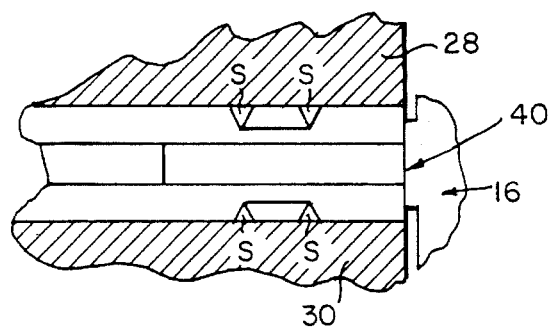
FIG. 3 is a view partly in section showing the endcap engaged with the housing, after the housing has been staked.
Figure 5:
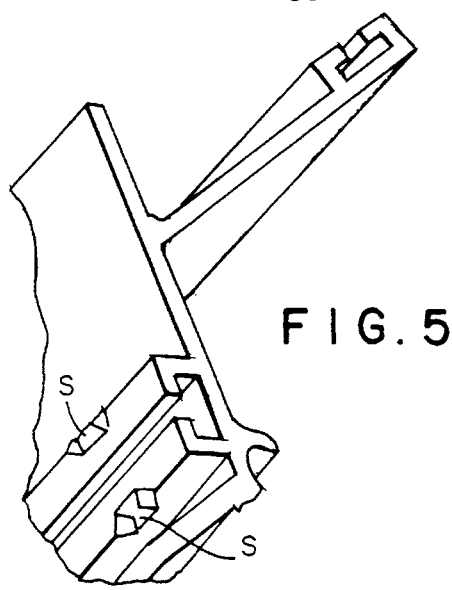
FIG. 5 is a view in perspective to illustrate the staking.

The tabs 40 may be further secured to housing 10 by staking portions of lips 28 and 30 marked S as shown in FIGS. 3 and 5. Staking is a process in which portions of lips 28 and 30 are deformed e.g. by squeezing them toward each other with a crimping tool.

Figure 4:
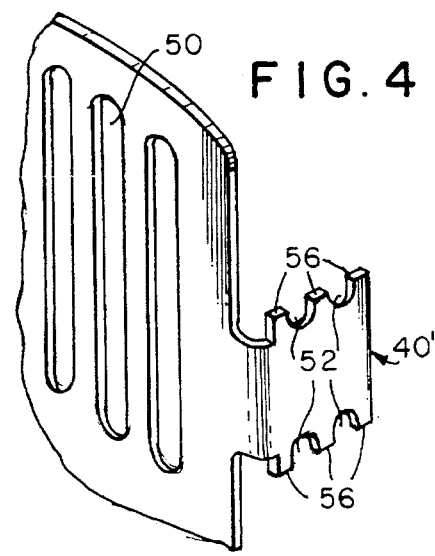
FIG. 4 is a fragmentary perspective view of another embodiment of an endcap.

A second embodiment of the invention is shown in FIG. 4. In this version, tabs 40' are planar and are provided with upper and lower edges 46', 48' from which portions 52 have been removed, resulting in a scalloped edge 54 having projections 56 separated by recesses 58. After tab 40' is inserted into channel 26, lips 28 and 30 are staked. The staked metal tends to flow into the recesses 58, securing tab 40' and endcaps 16, 18 to housing 10.

Having now described preferred embodiments of the invention, it is not intended that it be limited except as may be required by the appended claims.

We claim:

1. In an air bag module comprising:
   (1) a generally "U" shaped housing having two upstanding sidewalls connected by a "U" shaped base;
   (2) a pair of endcaps connected to said housing to define a volume adapted to receive an inflator at the bottom of said "U" shaped housing and an air bag cushion assembly between the upstanding sidewalls of said "U" shaped housing; and
   (3) means to connect said endcaps to said housing;
   the improvement in said connecting means consisting of:
   at least one channel in each of the upstanding walls of said "U" shaped housing; and a pair of tabs bent from each of said endcaps and shaped to enter the channels on the sides of said upstanding sidewalls,
   said end caps being securely fastened to said housing by insertion of said tabs into said channels and staking said channels to said tabs to improve the connection between said end caps and said housing.

2. In an air bag module comprising:
   (1) a generally "U" shaped housing having two upstanding sidewalls connected by a "U" shaped base;
   (2) a pair of endcaps connected to said housing to define a volume adapted to receive an inflator at the bottom of said "U" shaped housing and an air bag cushion assembly between the upstanding sidewalls of said "U" shaped housing; and
   (3) means to connect said endcaps to said housing;
   the improvement in said connecting means comprising:
   at least one channel in each of the upstanding sidewalls of said "U" shaped housing; and a pair of tabs bent from each of said endcaps and shaped to enter the channels on said upstanding sidewalls, said end caps being securely fastened to said housing by inserting said tabs into said channels, said tabs having scalloped edges to enhance gripping when said channel members are secured to said endcaps by staking said channel members.

3. In an air bag module comprising:
   (1) a generally "U" shaped housing having two upstanding sidewalls connected by a "U" shaped base;
   (2) a pair of endcaps connected to said housing to define a volume adapted to receive an inflator at the bottom of said "U" shaped housing and an air bag cushion assembly between the upstanding sidewalls of said "U" shaped housing; and
   (3) means to connect said endcaps to said housing; the improvement in said connecting means comprising:
   at least one channel in each of the upstanding sidewalls of said "U" shaped housing;
   and a pair of tabs bent from each of said endcaps and shaped to enter the channels on said upstanding sidewalls, said end caps being securely fastened to said housing by inserting said tabs into said channels, said tabs being channel-shaped with serrated edges to facilitate gripping between said tabs and the channels in said sidewalls.

* * * * *